United States Patent [19]
Molee et al.

[11] Patent Number: 5,380,047
[45] Date of Patent: * Jan. 10, 1995

[54] AUTHENTICATION SYSTEM

[75] Inventors: Warren F. Molee, Laguna Niguel; Stuart M. Ellis, Carlsbad, both of Calif.

[73] Assignee: The Upper Deck Company, Carlsbad, Calif.

[*] Notice: The portion of the term of this patent subsequent to Dec. 7, 2010 has been disclaimed.

[21] Appl. No.: 78,735

[22] Filed: Jun. 16, 1993

Related U.S. Application Data

[63] Continuation-in-part of Ser. No. 954,114, Sep. 30, 1992, Pat. No. 5,267,756.

[51] Int. Cl.[6] .......................................... B42D 15/00
[52] U.S. Cl. .................................. 283/86; 283/74
[58] Field of Search .................. 283/86, 74, 67, 70, 283/75, 79; 359/2

[56] References Cited

U.S. PATENT DOCUMENTS 5,128,779  7/1992  Mallik .................... 283/86 X
5,145,212  9/1992  Mallik .................... 359/2 X Primary Examiner—Willmon Fridie
Attorney, Agent, or Firm—Cahill, Sutton & Thomas

[57] ABSTRACT

An authentication system, method and article for memorabilia and other forms of articles wherein a first image-bearing medium is affixed to the article with a tamper-proof adhesive. A unique code number is imprinted on the medium. A certificate of authenticity is provided for the article and includes a second image-bearing medium with an identical unique code number. A list of unique code numbers is maintained to enable a purchaser of the article to register that article such that the purchaser or a subsequent purchaser can verify the authenticity of the authenticated article.

20 Claims, 2 Drawing Sheets

AUTHENTICATION SYSTEM

This is a continuation-in-part of U.S. patent application Ser. No. 07/954,114, filed on Sep. 30, 1992 now U.S. Pat. No. 5,267,756 and entitled "AUTHENTICATION SYSTEM."

BACKGROUND OF THE INVENTION

1. Field of the Invention

The present invention relates to authentication systems, and more particularly to authentication systems and methods for articles, such as memorabilia.

2. Description of the Prior Art

There is a substantial market in and for memorabilia and other articles, such as autographed sports items like baseballs, footballs, jerseys, and other articles. Unfortunately, it is all too easy to counterfeit such articles. For example, the signature of a famous baseball player on a baseball can be duplicated and replicated on other baseballs, and it is very difficult if not virtually impossible to determine whether the subsequent article is genuine or not. A system or method whereby the authenticity of an article such as this could be easily verified would be useful but is not available today.

SUMMARY OF THE INVENTION

Accordingly, an object of the present invention is to provide an authentication system or method for articles.

Another object of this invention is to provide an authentication system or method for memorabilia articles.

Another object of this invention is to provide a memorabilia article with verifiable authentication indicia.

A further object of this invention is to provide an improved certificate of authentication for an article.

Briefly, according to an exemplary embodiment of the present invention, an article is provided with an image-bearing medium which is affixed to the article with an adhesive so as to be tamper proof, and the medium having thereon a unique code number. Accompanying the article is a certificate of authenticity with a like or different image-bearing medium but with a matching code number. A master record or list of the unique code number and related article to which the code number applies is maintained by an entity which also provides a registration "hotline." The customer who purchases the article can register the same by mail or telephone with the entity and, at any time in the future when the article is sold or otherwise transferred, its authenticity can be verified through the registration hotline.

DESCRIPTION OF THE DRAWINGS

These and other features, objects and advantages of the present invention will become better understood through a consideration of the following description taken on conjunction with the drawings in which.

Figure 1:
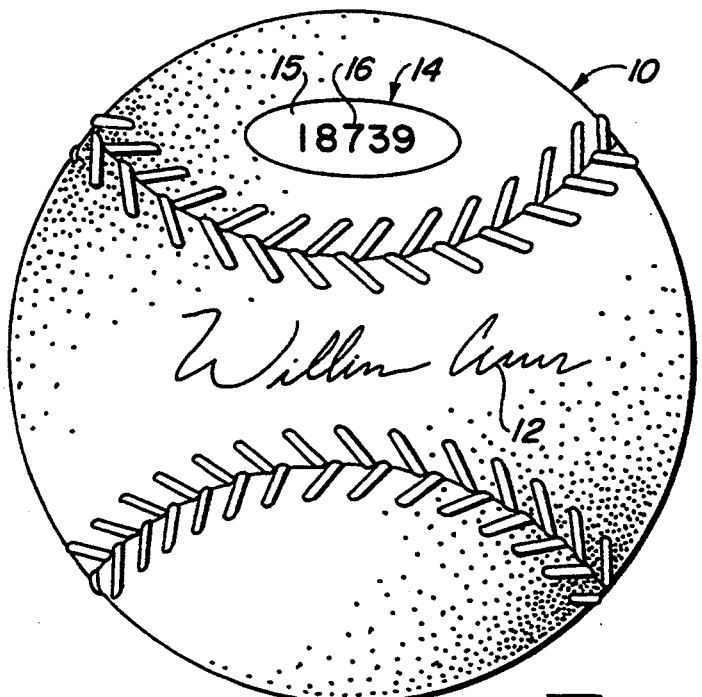
FIG. 1 is a drawing of an exemplary memorabilia item comprising a baseball having an authentication hologram and unique code number thereon according to the present invention.

Turning now to the drawings, an exemplary memorabilia item in the form of a conventional baseball 10 is illustrated in FIG. 1. The baseball in this example has an autograph 12 thereon, such as the autograph of a famous baseball player. The entity which maintains the registration hotline, such as the assignee of the present application, The Upper Deck Company, preferably will have the article, the baseball in this instance, signed in the presence of an employee of that entity as a witness and so that the article, the person signing and a unique code number for the article can be witnessed and entered into the entity's records.

A hologram 14 featuring a form of holographic image, trademark, logo or the like 15 is affixed with a conventional adhesive to the baseball 10 so as to be tamper proof. Furthermore, a unique product code number 16 (e.g., 18739 as shown, or an alpha numeric number) is imprinted on the hologram in a conventional manner. Through the use of a tamper proof hologram, the hologram 14 cannot be removed or copied without at east partially destroying the hologram. These tamper proof holograms are well known and comprise a hologram on a substrate with an overlying clear film. The hologram cannot be identically replicated, and the code number is printed on the surface of the film so that attempted removal of the hologram will result in removal of the film. The code number is unique and is not used again for another article.

Figure 2:
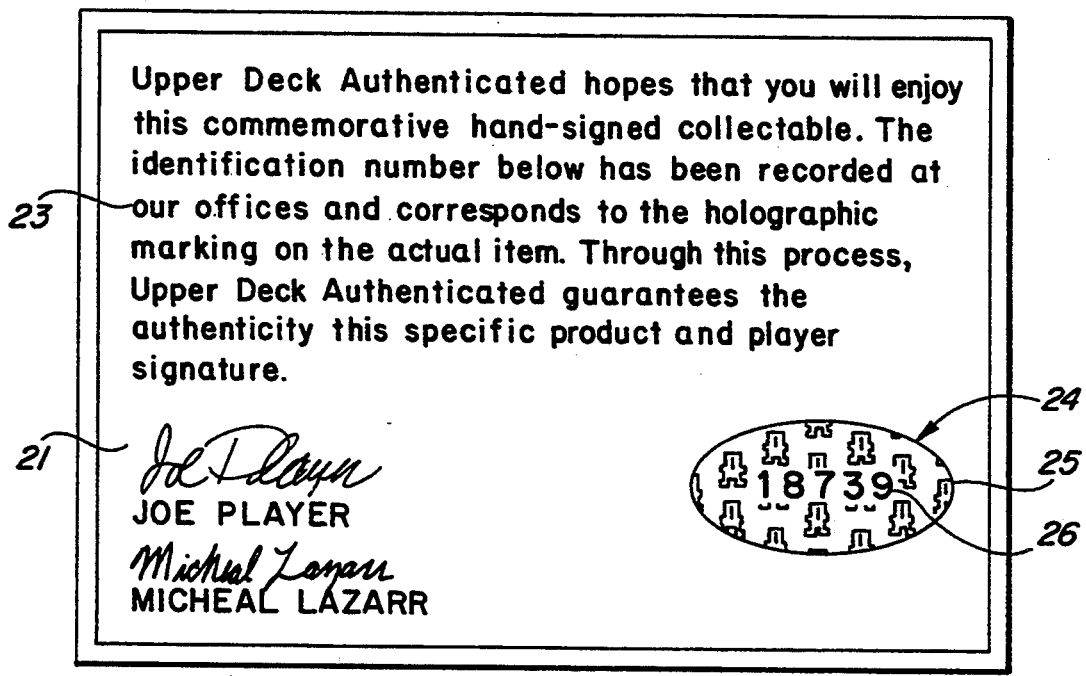
FIGS. 2 and 3 show an exemplary certificate of authenticity for the item of FIG. 1.
Figure 3:
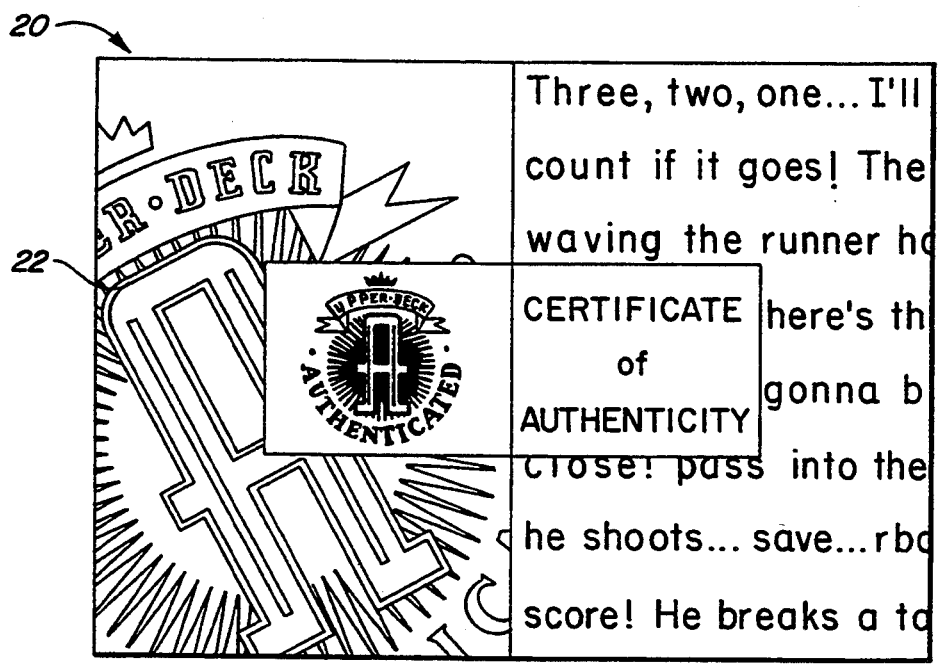

A certificate of authenticity 20 as shown in FIGS. 2 and 3 having front and back sides 21 and 22 accompanies the memorabilia article, the baseball 10 in this instance. This certificate on one side 21 bears a hologram 24 with an image, logo or the like 25 which may be identical to or different from the image 15 of the hologram 14 on the ball 10 and which also is tamper proof. However the hologram 24 bears an identical product code number 26 (e.g., 18739) to that on the hologram 14 of the baseball 10. Preferably, the hologram 14 and 24 have a similar shape. Every memorabilia article has a different unique code number (even if these articles comprise identical baseballs with original signatures of the same star). The front side 21 preferably has a suitable statement 23 about the authenticity of the article. The back side 22 of the certificate of authenticity can have any suitable identification, wording, logo or the like, such as that shown.

The memorabilia article and certificate are packed together, in this case the baseball 10 and certificate 20. Further, the product code number (e.g., 18739) is recorded at the registration entity, in this instance, for example, as "Baseball, hand-signed by Reggie Jackson in September 1992." The product comprising the baseball 10 and certificate 20 then is shipped to the customer. The customer, John Doe, can contact the registration hotline by mail or telephone (preferably an 800 number) to register the ball code number in the name of the customer. Subsequently, if that customer decides to sell the ball to another party, that other party can telephone or write to the registration hotline to confirm what item No. 18739 is and its authenticity. Then the registration hotline operator checks the listing or database of numbers and memorabilia items and confirms that item No. 18739 is a "Baseball, hand-signed by Reggie Jackson in September 1992."

Figure 4:
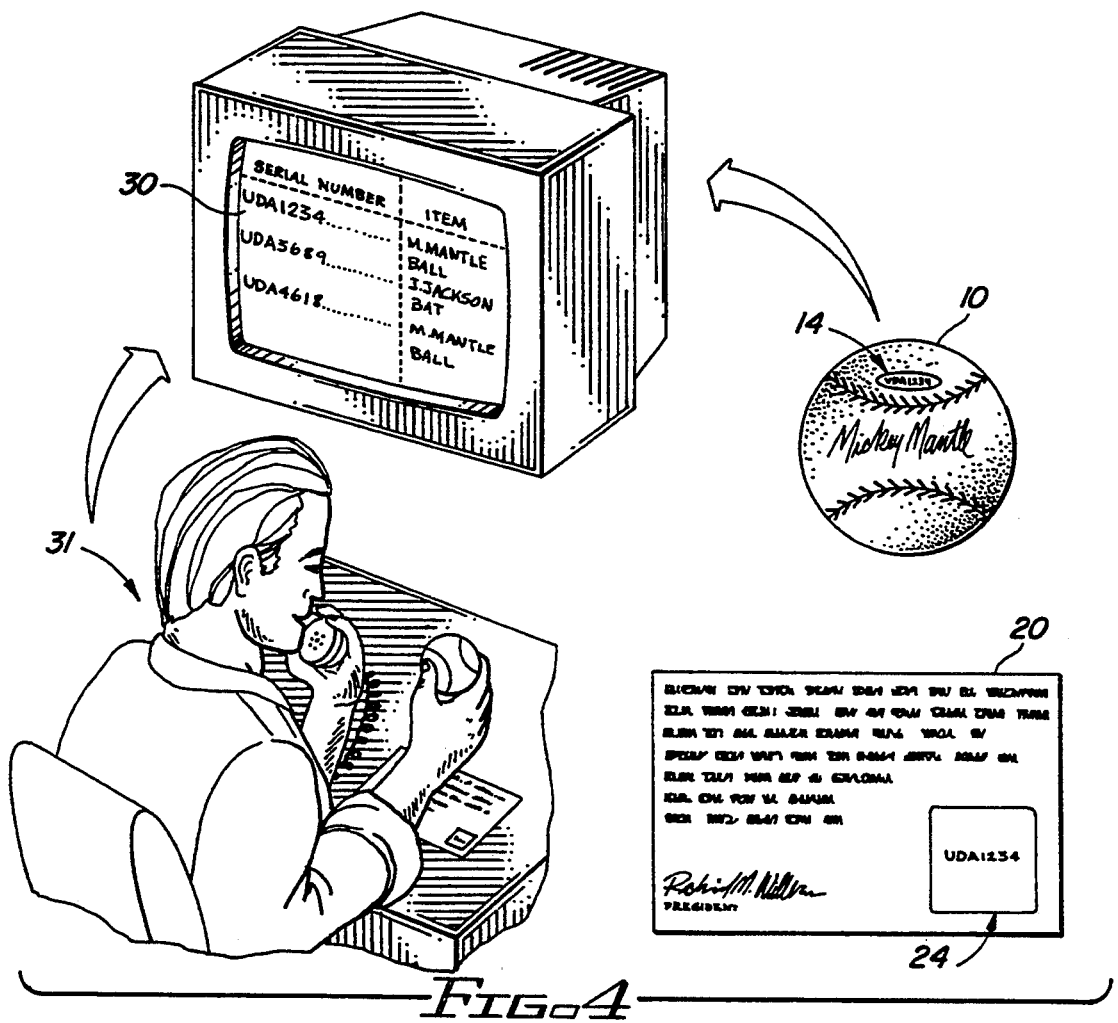
FIG. 4 is a flow diagram of an embodiment of the invention.

FIG. 4 is a simplified flow diagram illustrating the memorabilia item 10 in the form of a baseball signed by Mickey Mantle and with a hologram 14 with a unique code number UDA12345. This Figure also illustrates the associated certificate of authenticity 20 bearing a like or different hologram 24 but with an identical code number UDA12345. Such code numbers could also take the form of alphabetical code symbols, Roman numerals or other abstract symbols. Furthermore, this Figure illustrates the database or list of code numbers and the identity or descriptions of the associated item as illustrated at database 30 on a computer display. As described above, the customer or owner 31 upon purchasing the memorabilia item 10 may at any time check the authenticity of a memorabilia item 10 via the database or list 30 at the hotline.

Accordingly, the present system and method provides articles with a hologram and unique number, along with a certificate bearing a hologram and like unique number, to enable a customer to verify the authenticity of the article in a simple and efficient manner.

Although the preferred embodiment of the invention described above used a security device in the form of a hologram, a variety of equally useful, alternative security devices could readily be adapted for use in connection with the present invention. For example, rather than using an image-bearing medium in the form of a hologram, one could use other forms of image-bearing media including either mechanically or optically generated diffraction gratings which can be fabricated to include various two dimensional patterns, images or forms.

Depending on the degree of security required, other less secure forms of image-bearing media could function equally well with the present invention. For example, a specially created, unique, art work image created by any optical or mechanical means, whether embodying light diffractive characteristics or not, may in certain applications provide a suitable, although lower level of security which may be adequate in certain applications for lower priced goods. For optimum security, an image-bearing media capable of diffracting light such as diffraction gratings or holograms, will always provide the highest level of security and will typically be used in connection with high value items for which the authentication system of the present invention was primarily designed.

Existing products incorporating light diffracting media such as diffraction gratings and holograms are commercially available in the form of either multi-layer hot stamping foils or pressure sensitive composite materials. The hot stamping foils include a heat-activated adhesive for bonding the appropriate layer of the hot stamping foil to the exposed surface of the item to be authenticated. The pressure sensitive materials include a pressure sensitive adhesive for permanently bonding the material to a substrate. The pressure sensitive adhesive is covered by release paper prior to application.

The term "tamper proof" when used in connection with the image-bearing media of the present invention is defined to mean a medium having an image which will either be damaged or destroyed in response to attempted tampering, alteration or removal. Such damage frequently takes the form of delamination of the vacuum deposited reflective metal layer typically forming a part of pressure sensitive materials or of hot stamping foils which include images formed by diffractive patterns or, alternatively, damage in the form of delamination of the film or thermoplastic layers from the adhesive coated carrier backing in response to attempts to remove the image-bearing media from the surface to which it is bonded.

Although the items to be authenticated have been described in terms of basketballs, baseballs, baseball bats and gloves, the authentication system of the present system is equally well adapted for use in connection with the authentication of sports apparel including football or hockey helmets or fabric materials including jerseys, jackets, coats, uniforms and related materials.

When an image-bearing medium according to the present invention is affixed to a fabric material, it will typically be permanently affixed to such material by a heat-activated adhesive or an equivalent material such that attempted removal of the authenticating image-bearing medium will result either in destruction of the underlying fabric material, destruction of the image-bearing media itself or destruction of both elements.

As shown and described in connection with FIG. 2, in one embodiment of the authentication system of the present invention, the unique code number can be imprinted directly on the image-bearing media. In another embodiment of the invention, the unique code number, rather than being imprinted directly onto the image-bearing medium as illustrated in FIG. 2, could equally well be imprinted on the certificate in proximity to, but offset from, the image-bearing media.

In another embodiment of the invention, the image-bearing medium affixed to the article to be authenticated could be entirely different in form and appearance from the image-bearing medium affixed to the certificate of authenticity. For example, a hologram having a first image could serve as the image-bearing medium for the article to be authenticated while a two-dimensional diffraction grating depicting an entirely different image could be affixed to the certificate of authenticity. The serial number of both image-bearing media would be identical.

One particular method of implementing the necessary tamper proof aspect of the present invention is to utilize an adhesive which permanently bonds the image-bearing medium to the item to be authenticated or to the certificate of authenticity. The permanency of the bond is achieved by using an adhesive having a shear strength which exceeds the shear strength of the image-bearing medium.

It will be apparent to those skilled in the art that the authentication system of the present invention may be modified in numerous ways and may assume many embodiments other than the preferred forms specifically set out and described above. Accordingly, it is intended by the appended claims to cover all such modifications of the invention which fall within the broad scope of the invention disclosed above.

We claim:

1. An authentication system for an article comprising:
   a. an article for which authentication is desired;
   b. a first image-bearing medium affixed to the article with an adhesive to be tamper proof, the medium having imprinted thereon a unique code number;
   c. a certificate of authenticity for the article, and including thereon a second image-bearing medium with an identical unique code number; and
   d. a list of unique code numbers with a statement of the respective product to which each unique code number applies.

2. The system of claim 1 wherein the first and second image-bearing media each include a light diffracting pattern.

3. The system of claim 2 wherein at least one of the light diffracting patterns includes a hologram.

4. The system of claim 2 wherein the light diffracting pattern includes an optically generated diffraction pattern.

5. The system of claim 2 wherein the light diffracting pattern includes a mechanically generated diffraction pattern.

6. The system of claims 1 or 2 wherein the image of the first image-bearing medium and the image of the second image-bearing medium are identical.

7. The system of claims 1 or 2 wherein the image of the first image-bearing medium and the image of the second image-bearing medium are different.

8. The system of claim 1 wherein the list of unique code numbers is accessible by a purchaser of the article to enable the purchaser to verify the authenticity of the article through the unique code number.

9. The system of claim 1 wherein the article includes an autograph.

10. The system of claim 9 wherein the article is a baseball.

11. The system of claim 1 wherein the first image-bearing medium includes a holographic image on a substrate with an overlying clear thin film with an outer layer and the unique code number is imprinted on the outer surface of the film.

12. An authentication method for an article comprising the steps of:
   a. providing an article for which authentication is desired;
   b. affixing to the article a first image-bearing medium with an adhesive so as to be tamper proof;
   c. providing on the first image-bearing medium a unique code number;
   d. providing a certificate of authenticity for the article and including thereon a second image-bearing medium with an identical unique code number; and
   e. providing a list of unique code numbers with a statement of the respective products to which each of the unique code numbers apply, and providing in the list the unique code number for the article and a brief description of that article.

13. The method of claim 12 wherein the first and second image-bearing media include light diffracting patterns.

14. The method of claim 13 wherein either the first or the second image-bearing medium includes a hologram.

15. The method of claim 14 wherein the brief description identifies the article and a feature of the article for which authentication is desired.

16. The method of claim 15 wherein the feature is an autograph of a sports personality.

17. In an authentication system for enabling an article to be authenticated, wherein a certificate of authenticity is provided with each product and a list of unique code numbers describing each article and the associated code number, each article having at least one unique feature, such as a person's autograph, and having a first image-bearing medium affixed to the article with an adhesive so as to be tamper proof, the first image-bearing medium having imprinted thereon a unique code number and the unique code number and a brief description of the article being stated in the list, the corresponding certificate of authenticity including a second image-bearing medium having the same unique code number as the unique code number associated with the article.

18. The system of claim 17 wherein the first and second image-bearing media include light diffracting patterns.

19. The system of claim 18 wherein at least one of the image-bearing media includes a hologram.

20. The system of claim 19 wherein the unique feature includes an autograph.

* * * * *